US008873854B2

(12) United States Patent
Hamada (10) Patent No.: US 8,873,854 B2
(45) Date of Patent: Oct. 28, 2014

(54) IMAGE PROCESSING METHOD (75) Inventor: Toshiki Hamada, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 240 days.

(21) Appl. No.: 13/595,307

(22) Filed: Aug. 27, 2012

(65) Prior Publication Data
US 2013/0051698 A1 Feb. 28, 2013

(30) Foreign Application Priority Data

Aug. 31, 2011 (JP) ................................ 2011-189538

(51) Int. Cl.
*G06K 9/34* (2006.01)
*G06T 7/00* (2006.01)
*H04N 13/00* (2006.01)
*G06T 5/00* (2006.01)
*G06T 7/20* (2006.01)

(52) U.S. Cl.
CPC .. *H04N 13/0018* (2013.01); *G06T 2207/10021* (2013.01); *G06T 7/0081* (2013.01); *G06T 7/0097* (2013.01); *H04N 13/0037* (2013.01); *G06T 5/008* (2013.01); *G06T 7/2053* (2013.01); *G06T 2207/20144* (2013.01)
USPC ......................................... 382/173

(58) Field of Classification Search
CPC ........... G06T 2207/10016; G06T 2207/10024; G06T 2207/30201; G06T 2207/30232; G06T 7/2053; G06T 2207/30241; G06T 2207/20144; G06T 2207/30041; G06T 2207/30101; G06T 2207/30236; G06T 7/0097; G06T 7/408
See application file for complete search history.

(56) References Cited

U.S. PATENT DOCUMENTS

| 5,732,204 | A | 3/1998 | Fukushima et al. |
|---|---|---|---|
| 6,064,391 | A | 5/2000 | Sano et al. |
| 7,348,978 | B2 | 3/2008 | Nagata et al. |
| 7,471,849 | B2 | 12/2008 | Peterson |
| 7,664,338 | B2 | 2/2010 | Zhou |
| 2004/0105493 | A1* | 6/2004 | Kondo et al. ............. 375/240.08 |
| 2004/0220466 | A1* | 11/2004 | Matsumoto ................... 600/407 |
| 2007/0086675 | A1* | 4/2007 | Chinen et al. ................. 382/284 |
| 2008/0247655 | A1* | 10/2008 | Yano ............................. 382/232 |
| 2009/0128478 | A1 | 5/2009 | Dembo |
| 2009/0136158 | A1 | 5/2009 | Tamura |
| 2009/0225183 | A1 | 9/2009 | Tamura |
| 2009/0324074 | A1 | 12/2009 | Dembo |
| 2011/0221756 | A1 | 9/2011 | Inoue et al. |

FOREIGN PATENT DOCUMENTS

| JP | 08-036145 A | 2/1996 |
|---|---|---|
| JP | 2003-259395 A | 9/2003 |
| JP | 2005-258013 A | 9/2005 |
| JP | 2009-147922 A | 7/2009 |
| WO | WO-2009/066590 | 5/2009 |
| WO | WO-2009/066783 | 5/2009 |

* cited by examiner

*Primary Examiner* — Jingge Wu
(74) *Attorney, Agent, or Firm* — Eric J. Robinson; Robinson Intellectual Property Law Office, P.C.

(57) ABSTRACT

An image processing method for increasing the stereoscopic effect of an image is provided. Difference mask data including an object area and a background area is created from image data, and the center coordinate of the object area is calculated. Then, a gradation pattern is selected in accordance with the average brightness value of the object area and applied to the background area, whereby a gradation mask data is created. After that, the image data of the background area is converted into image data based on the gradation mask data, so that the stereoscopic effect of the image is increased.

15 Claims, 12 Drawing Sheets

(N−1)-TH FRAME

FIG. 8A2

N-TH FRAME

FIG. 8A3

(N+1)-TH FRAME

IMAGE PROCESSING METHOD

BACKGROUND OF THE INVENTION

1. Field of the Invention

The present invention relates to an image processing method. The present invention also relates to an image processing program.

2. Description of the Related Art

A variety of display devices have come onto the market, ranging from large-size display devices such as television receivers to small-size display devices such as cellular phones. From now on, the display devices will be expected to have higher added values, and development has been advanced. In recent years, display devices capable of displaying stereoscopic images have been actively developed to provide more realistic images.

Many of the display devices capable of displaying stereoscopic images utilize binocular parallax. The method utilizing binocular parallax mostly uses, for example, special glasses for delivering different images to the left and the right eyes of a viewer.

Some of the methods utilizing binocular parallax do not require special glasses: a display portion is additionally provided with a mechanism (e.g., a parallax barrier, a lenticular lens, or a microlens array) for delivering different images to the left and the right eyes of a viewer, so that stereoscopic images can be seen by a naked eye (see Patent Document 1, for example).

[Reference]

[Patent Document 1] Japanese Published Patent Application No. 2005-258013

SUMMARY OF THE INVENTION

The aforementioned display devices capable of displaying stereoscopic images by utilizing binocular parallax, needs an additional mechanism of a display portion or special glasses. Accordingly, an increase in manufacturing cost and power consumption becomes serious.

Other than the binocular parallax, physiological factors allow the human eye to perceive stereoscopic images psychologically or empirically. The physiological factors include the size of an object, the arrangement of an object, contrast, shade, clarity, and the like. These sensuous factors for perceiving stereoscopic images are advantageous in that a display portion does not require an additional mechanism; however, they are already provided to a two-dimensional image. Therefore, a method for further increasing a stereoscopic effect is needed.

Thus, an object of one embodiment of the present invention is to provide an image processing method which is a simple method for further increasing the stereoscopic effect of a two-dimensional image.

One embodiment of the present invention is an image processing method for further increasing the stereoscopic effect of two-dimensional moving image data having a plurality of frames. First, difference mask data is created by dividing image data into an object area and a background area. Then, the center coordinate data of each object area is calculated. Next, a gradation pattern is selected in accordance with the average brightness value of the object area, and gradation mask data is created by applying the gradation pattern to the background area. After that, original image data of the background area is converted based on the gradation mask data, whereby the stereoscopic effect of the image can be increased.

One embodiment of the present invention is an image processing method in which moving image data having a plurality of frames is processed with an arithmetic unit. A difference of image data between frames is calculated to create binary difference mask data including an object area and a background area. The center coordinate data of the object area is calculated and the average brightness value of the object area is calculated. Gradation mask data is created by applying a gradation pattern based on the average brightness value to the background area. The image data is converted into image data based on the gradation mask data.

In the image processing method of one embodiment of the present invention, the difference mask data is preferably created based on difference image data that is obtained from the difference in the brightness value of image data between the (n−1)-th frame and the n-th frame, and between the n-th frame and the (n+1)-th frame.

In the image processing method of one embodiment of the present invention, the center coordinate data is preferably obtained by labeling processing.

In the image processing method of one embodiment of the present invention, the average brightness value is preferably obtained by dividing the sum of the brightness values of pixels in the object area by the number of pixels in the object area.

In the image processing method of one embodiment of the present invention, the gradation pattern is preferably selected from the following in accordance with the brightness value: a pattern in which a brightness value decreases outward from the center coordinate; and a pattern in which a brightness value increases outward from the center coordinate.

In the image processing method of one embodiment of the present invention, image data is converted in accordance with gradation mask data, and the brightness value of the image data is preferably used in the object area while the average of the brightness value of the image data and the brightness value of the gradation mask data is preferably used in the background area.

According to one embodiment of the present invention, it is possible to provide an image processing method which is a simple method for further increasing the stereoscopic effect of a two-dimensional image.

BRIEF DESCRIPTION OF THE DRAWINGS

In the accompanying drawings:

FIGS. 8A1 to 8D are views showing Embodiment 1;
FIGS. 10A1 to 10C2 are views showing Embodiment 1.

DETAILED DESCRIPTION OF THE INVENTION

The present invention will be described below with reference to drawings. Note that the present invention can be implemented in a lot of different ways, and it is apparent to those skilled in the art that modes and details can be modified in a wide variety of ways without departing from the spirit and scope of the present invention. Therefore, the present invention is not interpreted as being limited to the description of the embodiment.

(Embodiment 1)

A display device of one embodiment of the present invention will be described with reference to FIG. 1.

Figure 1:
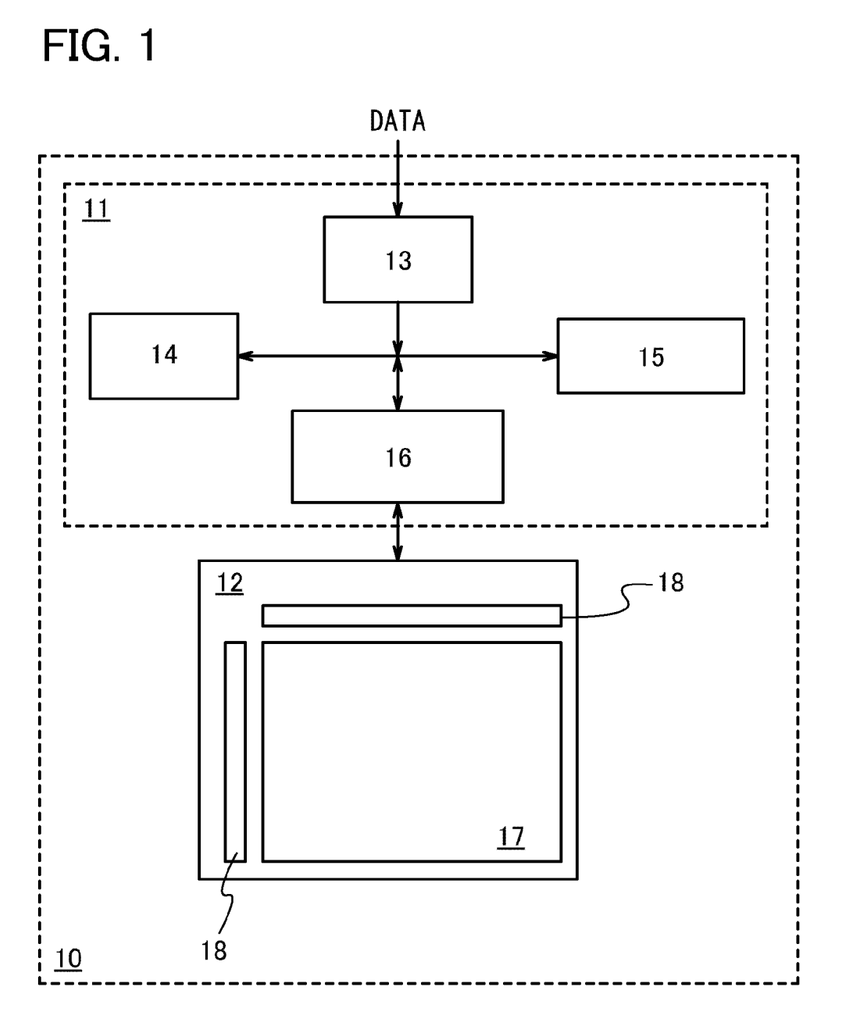
FIG. 1 is a block diagram showing Embodiment 1.

As shown in FIG. 1, a display device 10 of one embodiment of the present invention includes an image data processing portion 11 and a display portion 12. In the image data processing portion 11, image data data input to the display device 10 is subjected to image processing so that converted image data is generated. On the display portion 12, images are displayed in accordance with the converted image data.

The image data processing portion 11 shown in FIG. 1 includes an input portion 13, an arithmetic unit 14, a memory unit 15, a display controller 16, and the like.

The input portion 13 is an interface for converting the format of the image data input to the display device 10 into the format for the display device 10.

In the description, the image data input to the input portion 13 is moving image data having a plurality of frames; however, it may be still image data. Further, the image data may correspond to either a full-color image or a monochrome image. In the case of corresponding to a full-color image, the image data includes pieces of image data for the respective hues.

Note that in this specification, a full-color image refers to an image displayed by using the gray scale of a plurality of colors with different hues. Meanwhile, a monochrome image refers to an image displayed by using the gray scale of colors with a hue.

The arithmetic unit 14 has a function of collectively controlling the operation of the input portion 13, the memory unit 15, and the display controller 16 included in the image data processing portion 11. Furthermore, in the arithmetic unit 14, image data is subjected to image processing by various kinds of arithmetic operations such as logic operations and four arithmetic operations, whereby image data after conversion can be obtained.

The memory unit 15 has a function of temporarily storing image data whose format has been converted in the input portion 13. Specifically, moving image data having a plurality of frames is temporarily stored in the memory unit 15 and used for the arithmetic operation in the arithmetic unit 14. In addition, the memory unit 15 can temporarily store data used for the arithmetic operation in the arithmetic unit 14. The memory unit 15 can also temporarily store image data converted in the arithmetic unit 14. Furthermore, the memory unit 15 can store instruction (program) executed in the arithmetic unit 14. The instruction (program) to be executed in the arithmetic unit 14, which is stored in the memory unit 15, can be executed when read out in the arithmetic unit 14.

With the use of the image data that has been subjected to image processing, the display controller 16 generates an image signal which meets the specifications of the display portion 12. The generated image signal is supplied to the display portion 12. The display controller 16 also has a function of supplying the display portion 12 with a power supply potential or a driving signal for controlling driving of the display portion 12, such as a clock signal or a start pulse signal.

The display portion 12 includes a pixel portion 17 for displaying an image with the use of an image signal, and driver circuits 18 for controlling operation of the pixel portion 17. For the pixel portion 17, the following devices for displaying an image by controlling the gray scale of each pixel can be used: a liquid crystal display device, a light-emitting device including a light-emitting element such as an organic light-emitting element (OLED), electronic paper, digital micromirror device (DMD), plasma display panel (PDP), field emission display (FED), and the like.

Next, description is made on the image processing method of one embodiment of the present invention, which is performed in the display device 10 shown in FIG. 1.

Figure 2:
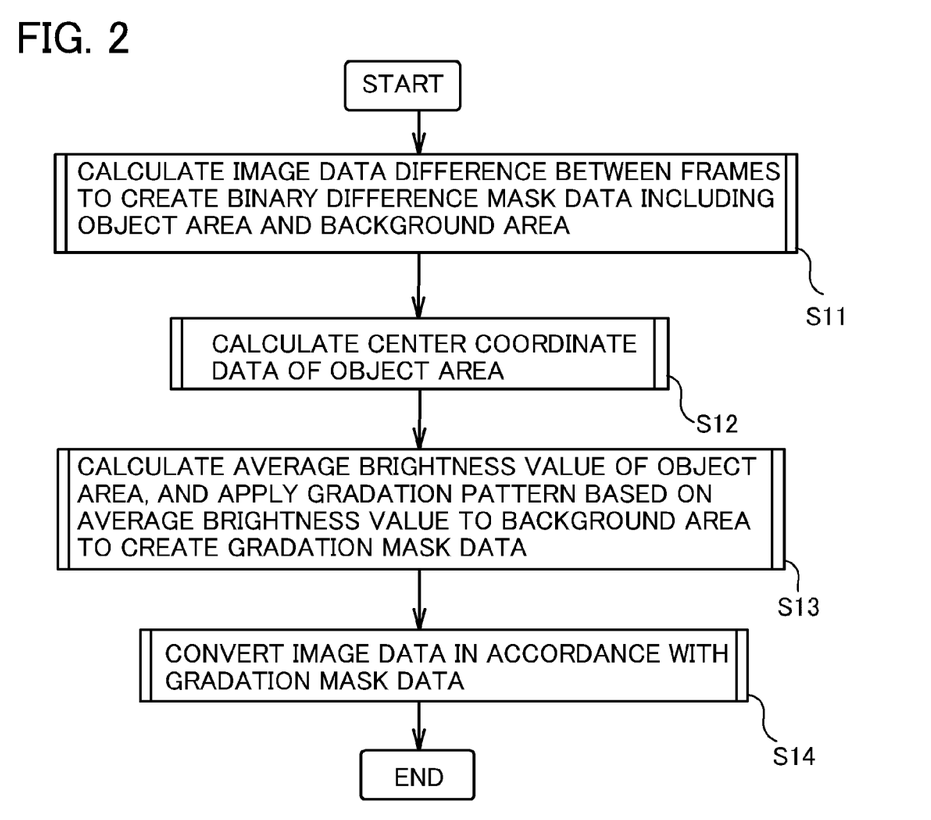
FIG. 2 is a flow chart showing Embodiment 1.

FIG. 2 is a flow chart showing an example of the image processing method of one embodiment of the present invention. Note that each processing of the image processing method shown in FIG. 2 is arithmetic processing carried out in the arithmetic unit 14 in FIG. 1.

First, a difference of image data between frames is calculated to create binary difference mask data including an object area and a background area (step S11: difference mask data creation).

Note that the object area refers to a part of one frame image, which is occupied by an object to which a viewer pays attention, here, a moving object. The background area refers to the other part of one frame image, namely, the area other than the object area.

Note that the difference mask data is obtained in such a manner that each pixel in one frame image is represented by binary data. Specifically, the difference mask data corresponds to data of one frame in which pixels in the object area are each represented by '1' and pixels in the background area are each represented by '0'. In the case where the difference mask data in one frame is made visible, for example, the object area can be represented by white and the background area can be represented by black.

Then, the center coordinate data of the object area is calculated (step S12: center coordinate data creation)

Next, the average brightness value of the object area is calculated to create gradation mask data, which is obtained by replacing the difference mask data corresponding to the background area with data having a gradation pattern based on the average brightness value (step S13: gradation mask data creation).

Note that the average brightness value is obtained by dividing the sum of the brightness values of pixels in the object area by the number of pixels in the object area. The "brightness" here refers to the brightness of a pixel, and the brightness value may be referred to as a grayscale level. In the case where three pixels having hues of red (R), green (G), and blue (B) are used to display one color, each color of RGB is weighted and the brightness values of the three pixels are added to obtain a brightness value. Weighted brightness value of RGB is obtained by multiplying weighted brightness values of the respective colors and adding them. Specifically, in NTSC system, the brightness value S of a pixel is represented by the equation $S=0.30R_G+0.59G_G+0.11B_G$ where $R_G$ denotes the brightness value of R, $G_G$ denotes the brightness value of G, and $B_G$ denotes the brightness value of B. Note that hues other than RGB may also be used.

Instead of the average brightness value, the intermediate value between the maximum brightness value and the minimum brightness value can also be used.

Note that the gradation pattern means a pattern in which a continuous change from white to black or from black to white occurs in one direction or plural directions.

Figure 10A:
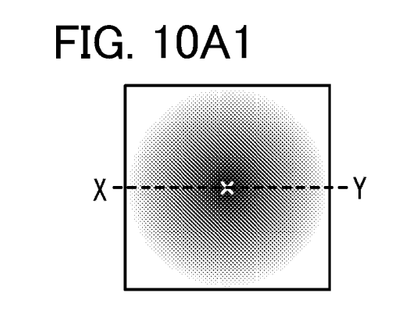
Figure 10A:
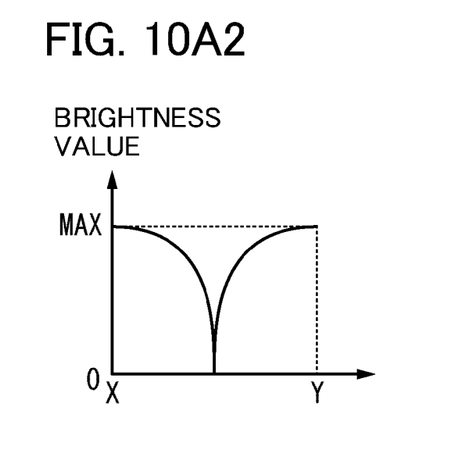
Figure 10B:
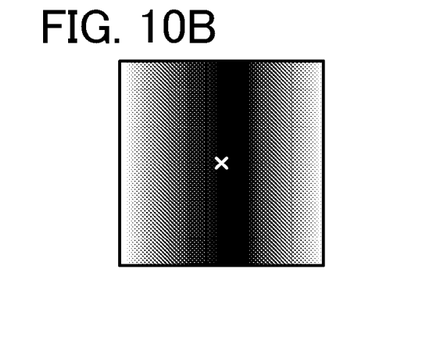
Figure 10C:
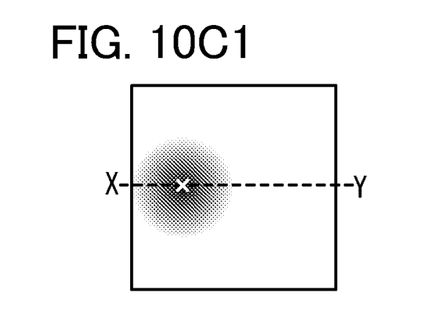
Figure 10C:
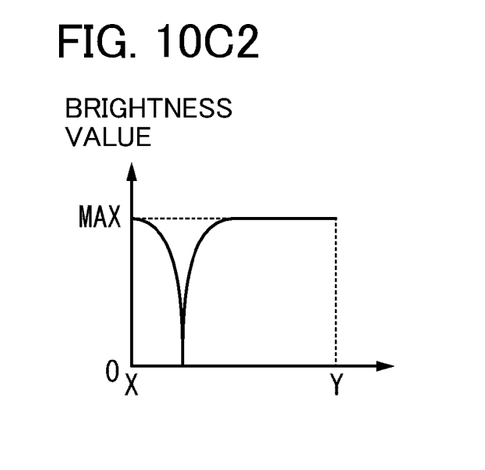

FIG. 10A1 shows an example of a concentric gradation pattern in which a continuous change from black to white occurs from the center coordinate (x in FIG. 10A1). The brightness value of the gradation pattern may be controlled as appropriate as shown in FIG. 10A2 in which dotted line XY denotes the horizontal direction: the brightness value sinks downwards at the center coordinate and the maximum brightness value is obtained in the periphery. Note that a continuous change of the brightness value from black to white in the gradation pattern may be a linear change. Alternatively, a continuous change from black to white in the gradation pattern may expand from the center coordinate in a rectangular shape with a width as shown in FIG. 10B.

In the case where the center coordinate to which the gradation pattern is applied is at the end of a screen, the brightness value may be controlled as appropriate as shown in FIGS. 10C1 and 10C2 in a manner similar to that in FIGS. 10A1 and 10A2: the brightness value sinks downwards at the center coordinate and the maximum brightness value is obtained in the periphery.

Figure 11A:
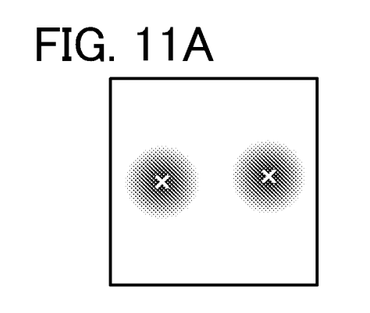
FIGS. 11A and 11B are views showing Embodiment 1.
Figure 11B:
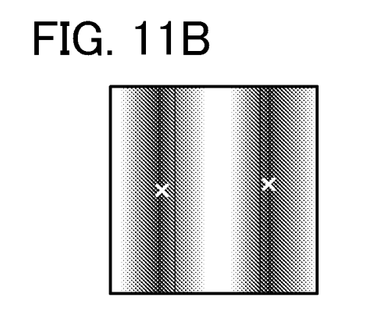

In the case where a plurality of center coordinates exist, the gradation pattern may be formed so that continuous changes from the center coordinates do not overlap each other as shown in FIGS. 11A and 11B.

Note that the gradation mask data is data having a gradation pattern with the object area as its center. The gradation mask data is obtained in such a manner that the difference mask data of the background area represented by black is replaced with data based on the aforementioned gradation pattern.

Then, the image data is converted into image data based on the gradation mask data (step S14: image data conversion).

Each of the aforementioned steps S11 to S14 will be specifically described with reference to the flow charts of FIG. 3, FIG. 4, FIG. 5, FIG. 6, and FIG. 7. Note that the flow charts of FIGS. 3 to 7 will be described in combination with the views of FIGS. 8A1 to 8D and FIGS. 9A to 9C, in which each data is made visible.

Figure 3:
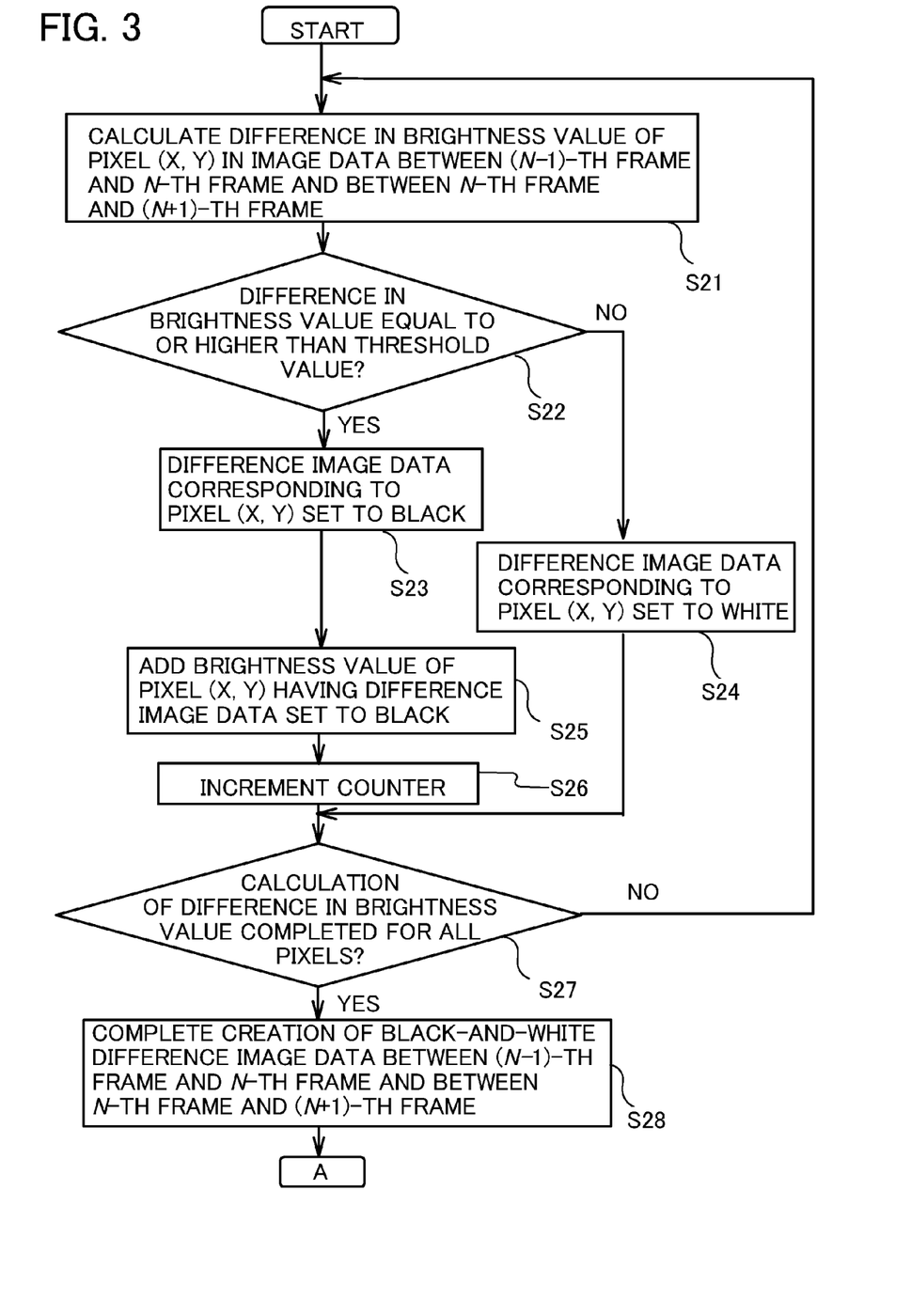
FIG. 3 is a flow chart showing Embodiment 1.
Figure 4:
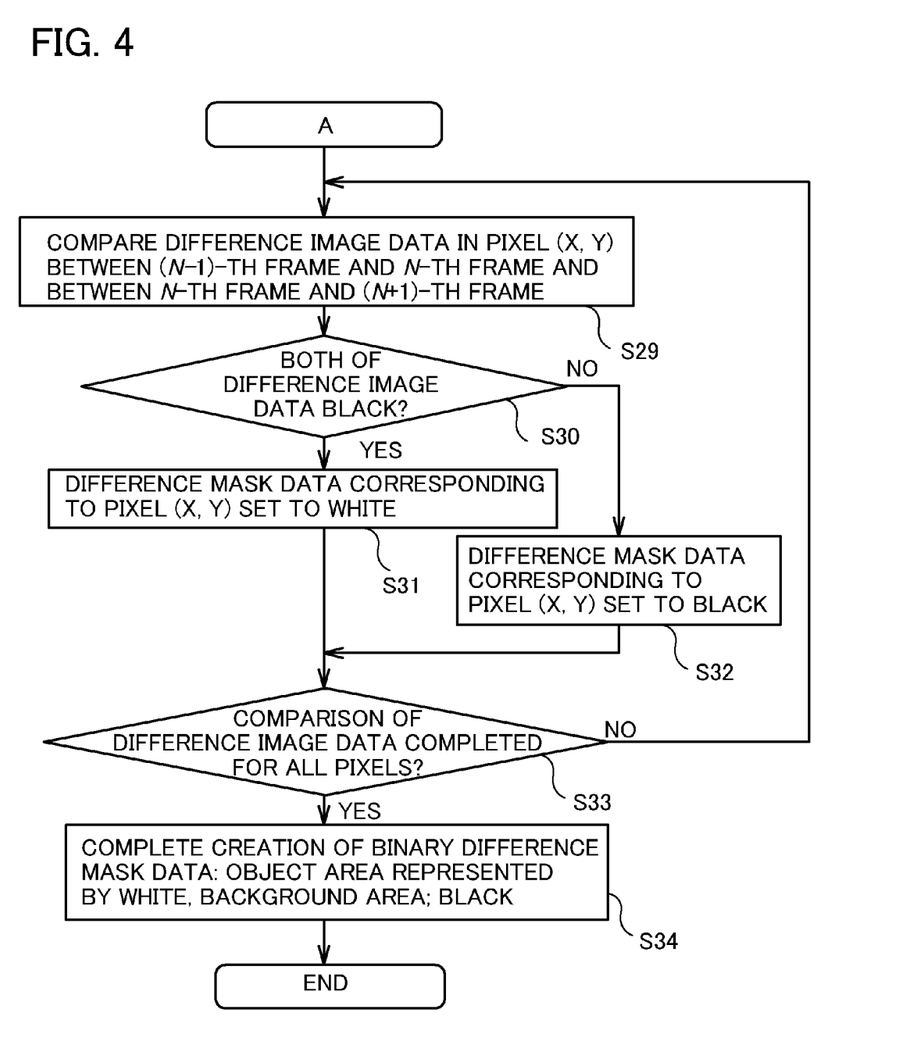
FIG. 4 is a flow chart showing Embodiment 1.

FIGS. 3 and 4 are flow charts each showing an example of the difference mask data creation in the step S11.

Figure 8A:
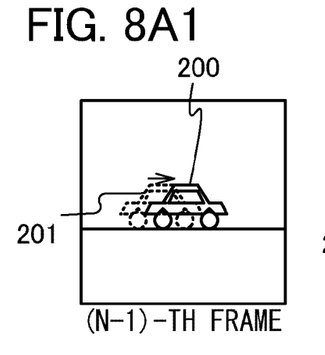
Figure 8A:
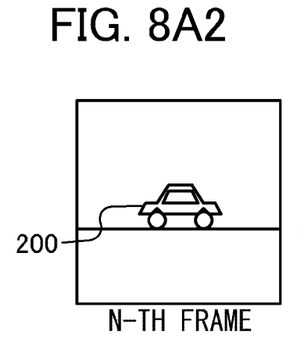
Figure 8A:
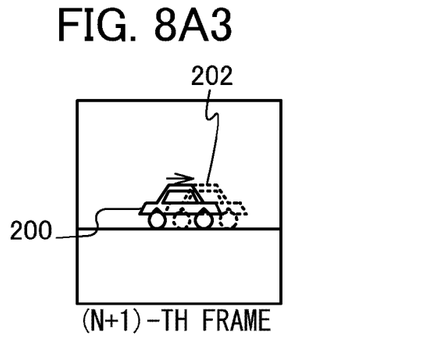

In the flow charts showing the steps S11 to S14, description is made on an example of converting image data in the n-the frame (n is a natural number of two or more) among the continuous frames: (n−1)-th frame, n-th frame, and (n+1)-th frame. Note that the image data in the (n−1)-th frame, the n-th frame, and the (n+1)-th frame can be made visible as shown in FIGS. 8A1 to 8A3, respectively, for example. In FIGS. 8A1 to 8A3, an object moves in the successive frames. In FIGS. 8A1 to 8A3, the object is denoted by a solid line 200, and the objects in the (n−1)-th frame and the (n+1)-th frame are denoted by dotted lines 201 and 202, respectively.

First, the difference in the brightness value of a pixel (x, y) in image data is calculated between the (n−1)-th frame and the n-th frame, and between the n-th frame and the (n+1)-th frame (step S21). A difference in brightness value may be calculated in the following manner: in the case where, for example, the brightness value of RGB in the (n−1)-th frame is (255, 255, 255) and the brightness value of RGB in the n-th frame is (125, 125, 125), (130, 130, 130) is obtained as a difference in brightness value and then, the brightness value of each color is weighted and calculated.

Next, it is determined whether the difference in the brightness value calculated in the step S21 is equal to or higher than a predetermined threshold brightness value (step S22). The threshold brightness value may be set as appropriate, and for example, may be set to an intermediate value between the maximum brightness value and the minimum brightness value.

When the difference in the brightness value calculated in the step S21 is determined in the step S22 to be equal to or higher than the predetermined threshold brightness value, difference image data corresponding to the pixel (x, y) is set to '0', namely, black (step S23). Note that the difference image data is temporary data for creating binary difference mask data including an object area and a background area.

When the difference in the brightness value calculated in the step S21 is determined in the step S22 to be lower than the predetermined threshold brightness value, difference image data corresponding to the pixel (x, y) is set to '1', namely, white (step S24).

Note that in the case where the difference image data is determined to be black in the step S23, among the image data for one frame, the brightness value of the pixel (x, y) in which the difference image data is determined to be black is added (step S25). Further, a counter is incremented to count the number of pixels (x, y) in which the difference image data is set to black in the image data for one frame (step S26). Note that the accumulated data of the brightness values added in the step S25, and the value counted in the step S26 are used for selecting a gradation pattern in a later step. It is to be noted that the steps S23 to S26 and the step S24 are performed alternately.

After the steps S24 and S26, it is determined whether the calculation of the difference in brightness value is completed for all the pixels for one frame (step S27). If the calculation of the difference in brightness value is not completed for all the pixels for one frame, the step S21 is restarted for another pixel.

Figure 8B:
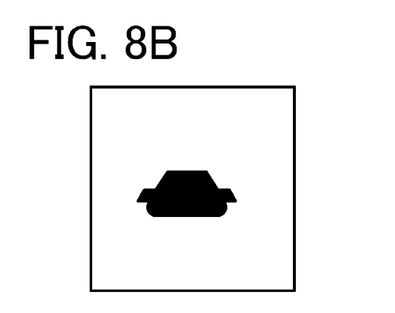
Figure 8C:
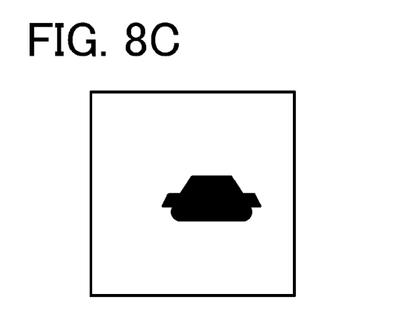

When the calculation of the difference in brightness value is completed for all the pixels for one frame in the step 27, finished is creation of the difference image data between the (n−1)-th frame and the n-th frame, and between the n-th frame and the (n+1)-th frame, which is black-and-white binary data (step S28). Note that the difference image data between the (n−1)-th frame and the n-th frame of the image data shown in FIGS. 8A1 and 8A2 can be made visible as shown in FIG. 8B, for example. Further, the difference image data between the n-th frame and the (n+1)-th frame of the image data shown in FIGS. 8A2 and 8A3 can be made visible as shown in FIG. 8C, for example. As shown in FIGS. 8B and 8C, an area in which the object moves between the frames is represented by black, and the other area is represented by white.

FIG. 4 shows the difference mask data creation in the step S11 following A after the step S28 in FIG. 3.

Following A after the step S28, comparison is performed in a pixel (x, y) between the difference image data between the (n−1)-th frame and the n-th frame, and the difference image data between the n-th frame and the (n+1)-th frame (step S29).

Next, it is determined whether both of the black-and-white binary difference image data compared in the step S29 are black (step S30).

If the difference image data compared in the step S29 are determined to be black in the step S30, difference mask data corresponding to the pixel (x, y) is set to '1', namely, white (step S31).

Meanwhile, when neither of the difference image data compared in the step S29 are determined to be black in the step S30, difference mask data corresponding to the pixel (x, y) is set to '0', namely, black (step S32).

After the steps S31 and S32, it is determined whether the comparison of the difference image data is completed for all the pixels for one frame (step S33). If the comparison of the difference image data is not completed for all the pixels for one frame, the step S29 is restarted for another pixel.

Figure 8D:
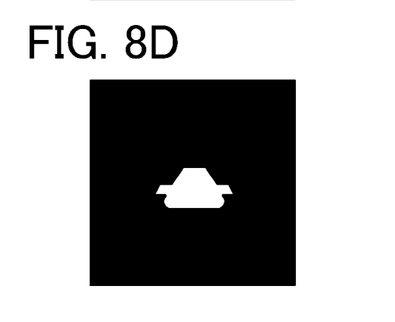

When the comparison of the difference image data is completed for all the pixels for one frame in the step S33, creation of the difference mask data which is binary data is finished (step S34). In the difference mask data, an object area is represented by white and a background area is represented by black. Note that the binary difference mask data corresponding to the difference image data shown in FIGS. 8B and 8C can be made visible as shown in FIG. 8D, for example. As shown in FIG. 8D, an area in which the object exists in the n-th frame image data is represented by white, and the other area is represented by black.

That is the flow chart showing an example of the difference mask data creation in the step S11. Note that one embodiment of the present invention is not limited to the processing shown in the flow charts of FIGS. 3 and 4, and other steps may be performed as long as difference mask data differentiating between an object area and a background area can be obtained. For the details of the difference mask data creation in the step S11, refer to Japanese Published Patent Application No. 2009-147922, which discloses image processing differentiating between an object area and a background area.

Figure 5:
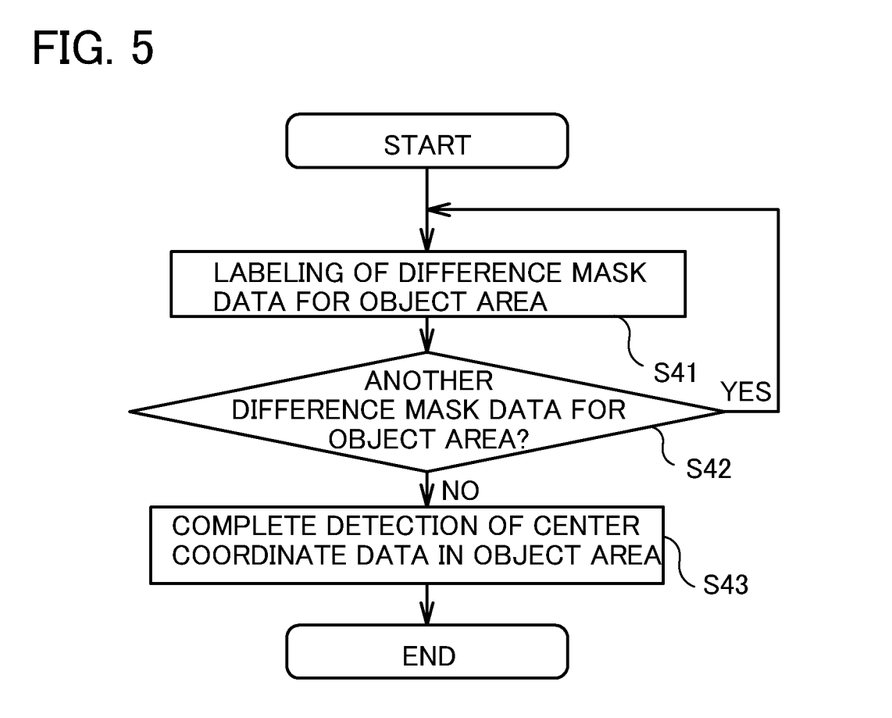
FIG. 5 is a flow chart showing Embodiment 1.

FIG. 5 is a flow chart showing an example of the center coordinate data creation in the step S12.

First, labeling of difference mask data is performed for an object area, whereby center coordinate data is specified (step S41).

Then, it is determined whether another object area to be processed in the step S41 exists (step S42).

If the labeling of the difference mask data is completed for all the object areas in the step S42, detection of the center coordinate data of the object areas is finished (step S43). When the labeling of the difference mask data is not completed for all the object areas, the step S41 is restarted for another object area. Note that the center coordinate data of the object area, which is obtained by labeling of the difference mask data shown in FIG. 8D, can be made visible as, for example, pointx in FIG. 9A.

That is the flow chart showing an example of the center coordinate data creation in the step S12. Note that one embodiment of the present invention is not limited to the processing shown in the flow chart of FIG. 5, and other steps may be performed as long as the center coordinate data of an object area can be obtained.

Figure 6:
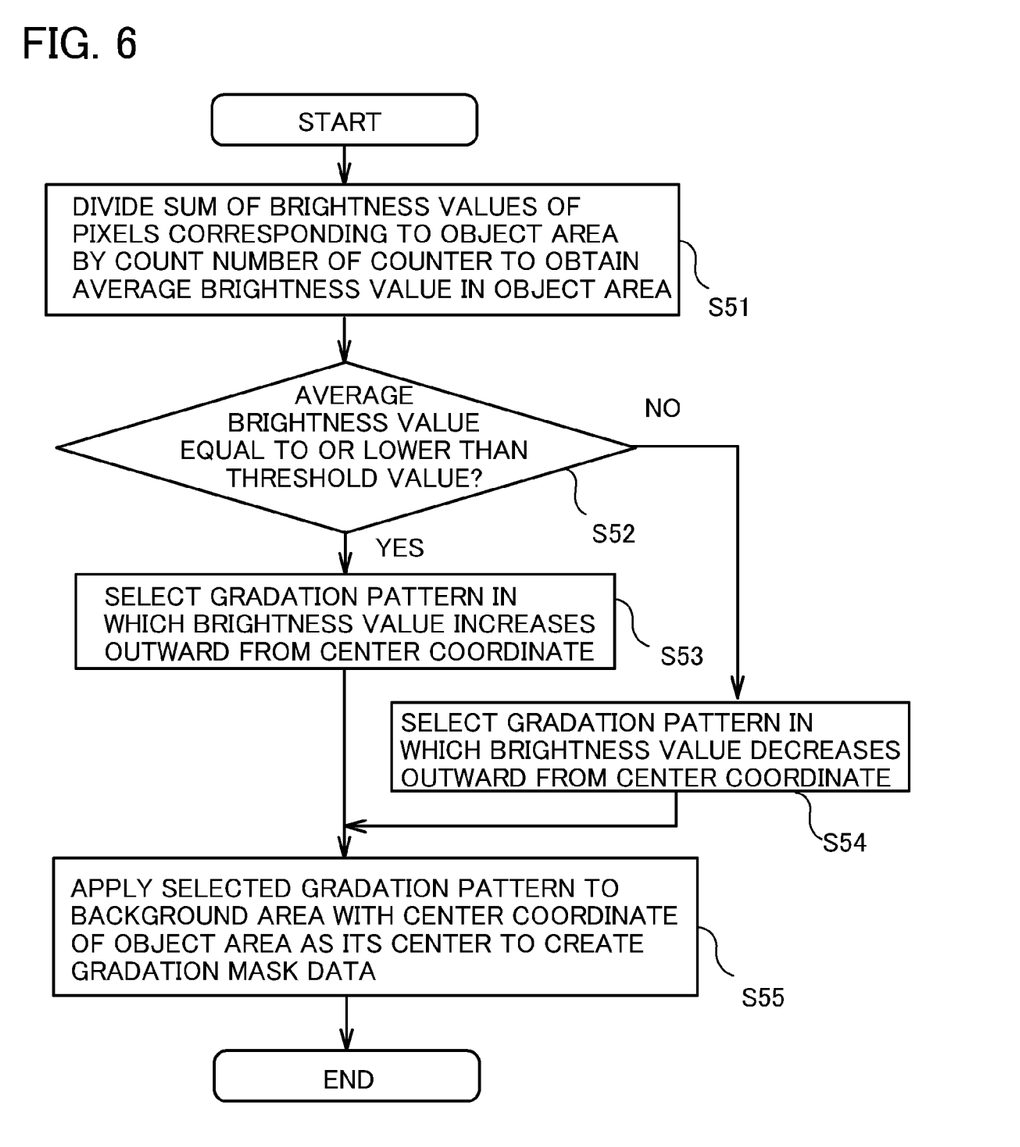
FIG. 6 is a flow chart showing Embodiment 1.

FIG. 6 is a flow chart showing an example of the gradation mask data creation in the step S13.

First, the sum of the brightness values of pixels corresponding to an object area is divided by the count number of a counter, whereby the average brightness value in the object area is calculated (step S51). Note that the values obtained in the aforementioned steps S25 and S26 are used as the sum of the brightness values of the pixels corresponding to the object area and the count number.

In the case where the intermediate brightness value is used instead of the average brightness value, the aforementioned step S51 for calculating the average brightness value is not performed, and the intermediate brightness value may be calculated. In the case of using the intermediate brightness value, the aforementioned steps S25 and S26 can be omitted.

Next, it is determined whether the average brightness value obtained in the step S51 is equal to or lower than the threshold value (step S52). A threshold average brightness value may be set as appropriate, and for example, may be set to an intermediate value between the maximum brightness value and the minimum brightness value.

When the average brightness value calculated in the step S51 is determined in the step S52 to be equal to or higher than a predetermined threshold average brightness value, a gradation pattern, in which the brightness value increases outward from the center coordinate, is selected (step S53).

When the average brightness value calculated in the step S51 is determined in the step S52 to be lower than the predetermined threshold average brightness value, a gradation pattern, in which the brightness value decreases outward from the center coordinate, is selected (step S54).

Figure 9A:
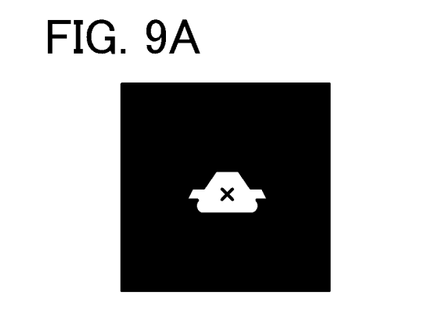
FIGS. 9A to 9C are views showing Embodiment 1.
Figure 9B:
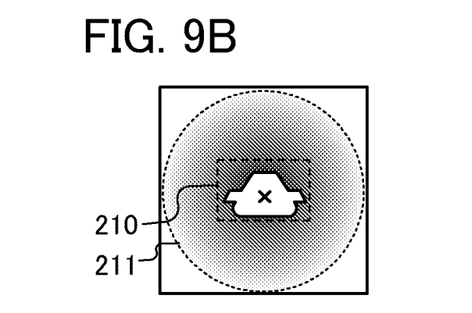

When the selection of a gradation pattern is completed in the steps S53 and S54, the selected gradation pattern is applied to the background area with the center coordinate of the object area as its center, whereby creation of the gradation mask data is finished (step S55). Application of the gradation pattern in which the brightness value increases outward from the center coordinate to the background area of the difference mask data shown in FIG. 8D, can be made visible as shown in FIG. 9B. The gradation mask data of FIG. 9B shows an object area 210 and a concentric gradation pattern 211 is arranged with the center coordinate of the object area 210 as its center.

That is the flow chart showing an example of the gradation mask data creation in the step S13. Note that one embodiment of the present invention is not limited to the processing shown in the flow chart of FIG. 6, and other steps may be performed as long as gradation mask data can be obtained.

Figure 7:
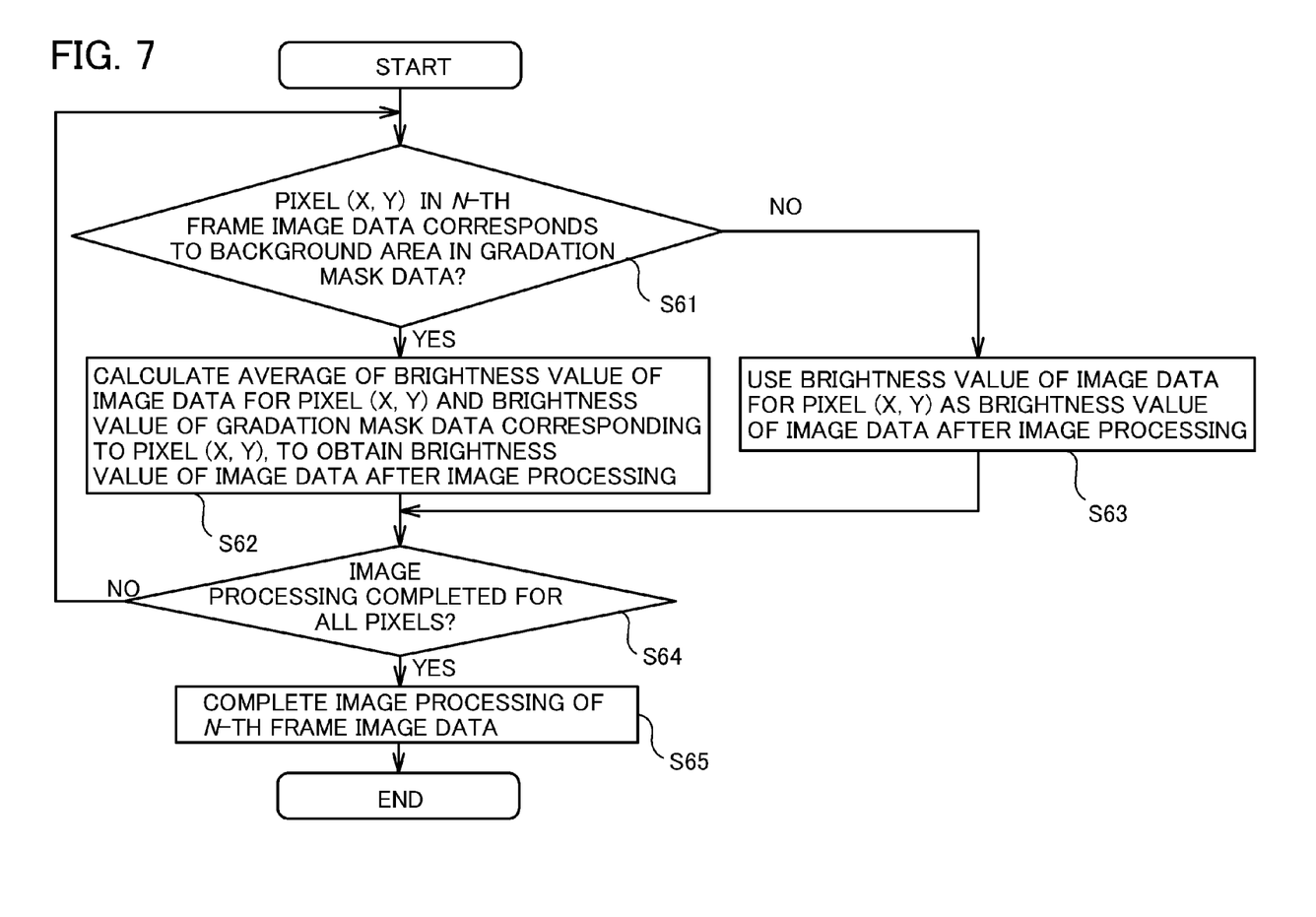
FIG. 7 is a flow chart showing Embodiment 1.

FIG. 7 is a flow chart showing an example of the image data conversion in the step S14.

First, it is determined whether a pixel (x, y) in the n-th frame image data corresponds to a background area in the gradation mask data (step S61).

When the pixel (x, y) in the n-th frame image data is determined in the step S61 to correspond to the background area in the gradation mask data, the average of the brightness value of the image data for the pixel (x, y) and the brightness value of the gradation mask data corresponding to the pixel (x, y), is calculated and used as a brightness value of image data after image processing (step S62).

When the pixel (x, y) in the n-th frame image data is determined in the step S61 to not correspond to the background area in the gradation mask data, that is, correspond to an object area, the brightness value of the image data for the pixel (x, y) before image processing is used without change as a brightness value of image data after image processing (step S63).

Then, it is determined whether the image processing in the step S61 is completed for all the pixels (step S64).

Figure 9C:
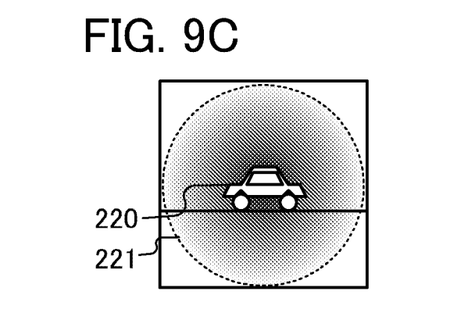

When the image processing is determined in the step S64 to be completed for all the pixels, the image processing of the n-th frame image data is completed (step S65). If the image processing is not completed for all the pixels in the step S64, the step S61 is restarted for another pixel. Note that the image processing using the gradation mask data, which is applied to the n-th frame image data shown in FIG. 8A2, can be made visible as shown in FIG. 9C, for example. The image data of FIG. 9C after the image processing has a brightness gradient in a background 221, in which a concentric gradation pattern is arranged with an object 220 as its center.

That is the flow chart showing an example of the image data conversion in the step S14. Note that one embodiment of the present invention is not limited to the processing shown in the flow chart of FIG. 7, and other steps may be performed as long as image data can be converted in accordance with the gradation mask data.

As described above, a gradation pattern is applied to a background area in the structure of this embodiment, whereby a higher stereoscopic effect can be given to data of a two-dimensional moving image with a plurality of frames. Thus, unlike a display device capable of displaying stereoscopic images by utilizing binocular parallax, an additional mechanism of a display portion or special glasses are not needed, resulting in a reduction in manufacturing cost and power consumption.

EXAMPLE 1

In this example, an image obtained by using the image processing method of one embodiment of the present invention will be described with reference to FIGS. 12A to 12E.

Figure 12A:
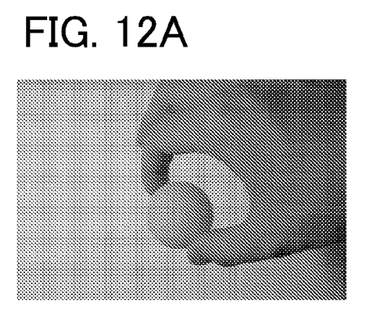
FIGS. 12A to 12E are photographs showing Example 1.

FIG. 12A shows an image with image data before processing. Although images in frames before and after that frame are not shown in this example, image processing was performed with a ball at the center of the image regarded as an object image.

Figure 12B:
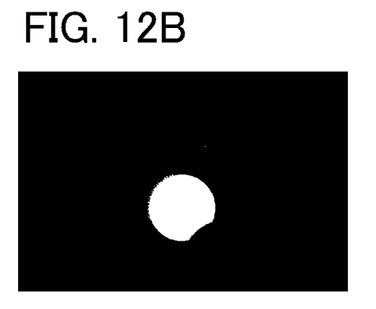

FIG. 12B shows binary difference mask data created based on the image data before processing. The ball shown in FIG. 12A was represented by white as an object image, and the other area was represented by black as a background area.

Figure 12C:
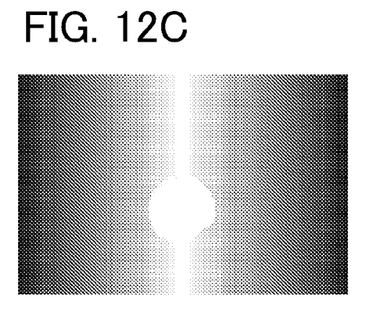
Figure 12D:
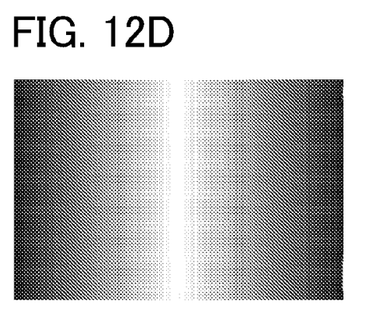

FIG. 12C shows gradation mask data obtained by applying a gradation pattern to the background area of the binary difference mask data. A gradation pattern shown in FIG. 12D, in which the brightness value decreases outward from the center coordinate of the object area, was selected as the gradation pattern, and applied to the background area in FIG. 12B, so that the gradation mask data of FIG. 12C was created.

Figure 12E:
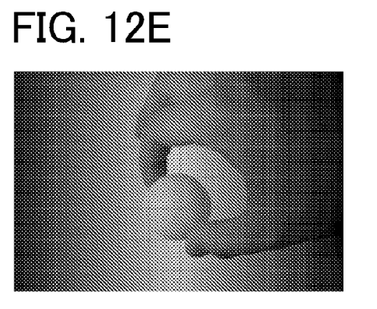

The image data of FIG. 12A was subjected to image processing using the gradation mask data shown in FIG. 12C, and an image with image data after the conversion processing is shown in FIG. 12E. As shown in FIG. 12E, application of the gradation pattern to the background area further increased the stereoscopic effect of the image data. Thus, this example showed that the application of the image processing method of one embodiment of the present invention to an object image made it possible to obtain a processed image having a higher stereoscopic effect than the object image.

This application is based on Japanese Patent Application serial No. 2011-189538 filed with Japan Patent Office on Aug. 31, 2011, the entire contents of which are hereby incorporated by reference.

What is claimed is:

1. An image processing method for processing image data having a plurality of frames, comprising the steps of:
calculating a difference between continuous frames of the image data, thereby creating binary difference mask data including an object area and a background area;
calculating center coordinate data of the object area;
calculating an average brightness value of the object area and applying a gradation pattern based on the average brightness value to the background area, thereby creating gradation mask data; and
converting the image data into image data based on the gradation mask data.

2. The image processing method according to claim 1, wherein the difference mask data is created based on difference image data that is obtained from a difference in brightness values of the image data between an (n−1)-th frame and an n-th frame, and between the n-th frame and an (n+1)-th frame.

3. The image processing method according to claim 1, wherein the center coordinate data is obtained by labeling processing.

4. The image processing method according to claim 1, wherein the average brightness value is obtained by dividing the sum of the brightness values of pixels in the object area by the number of pixels in the object area.

5. The image processing method according to claim 1, wherein the gradation pattern is selected from the following in accordance with the average brightness value: a pattern in which a brightness value decreases outward from the center coordinate; and a pattern in which a brightness value increases outward from the center coordinate.

6. The image processing method according to claim 1, wherein in the image data converted in accordance with the gradation mask data, the brightness value of the image data is used in the object area, and the average of the brightness value of the image data and the brightness value of the gradation mask data is used in the background area.

7. An image processing method for processing image data having a plurality of frames, comprising the steps of:
creating difference mask data by calculating a difference of image data between continuous frames, the difference mask data including an object area and a background area;
calculating center coordinate data of the object area by labeling processing;
calculating an average brightness value of the object area, wherein the average brightness value is obtained by dividing a sum of brightness values of pixels in the object area by the number of pixels in the object area;
creating gradation mask data by replacing the difference mask data corresponding to the background area with data having a gradation pattern based on the average brightness value; and
converting the image data into image data based on the gradation mask data.

8. The image processing method according to claim 7, wherein the difference mask data is created based on difference image data that is obtained from a difference in a brightness value of the image data between an (n−1)-th frame and an n-th frame, and between the n-th frame and an (n+1)-th frame.

9. The image processing method according to claim 7, wherein the gradation pattern is selected from the following in accordance with the brightness value: a pattern in which a brightness value decreases outward from the center coordinate; and a pattern in which a brightness value increases outward from the center coordinate.

10. The image processing method according to claim 7, wherein in the image data converted in accordance with the gradation mask data, the brightness value of the image data is used in the object area, and the average of the brightness value of the image data and the brightness value of the gradation mask data is used in the background area.

11. An image processing method for processing image data having a plurality of frames, comprising the steps of:
creating binary difference mask data based on the image data before processing, wherein an object image is represented by white as an object area, and the other area is represented by black as a background area;
selecting a gradation pattern in which the brightness value decreases outward from a center coordinate of the object area;
obtaining gradation mask data by applying the gradation pattern to the background area of the binary difference mask data; and
applying the gradation pattern to the background area of the image data before processing to image processing using the gradation mask data.

12. The image processing method according to claim 11, wherein the binary difference mask data is created based on difference image data that is obtained from a difference in brightness values of the image data between an (n−1)-th frame and an n-th frame, and between the n-th frame and an (n+1)-th frame.

13. The image processing method according to claim 11, wherein the center coordinate data is obtained by labeling processing.

14. The image processing method according to claim 11, wherein the average brightness value is obtained by dividing a sum of the brightness values of pixels in the object area by the number of pixels in the object area.

15. The image processing method according to claim 11, wherein the gradation pattern is selected from the following in accordance with the average brightness value: a pattern in which a brightness value decreases outward from the center coordinate; and a pattern in which a brightness value increases outward from the center coordinate.

* * * * *